2,877,412

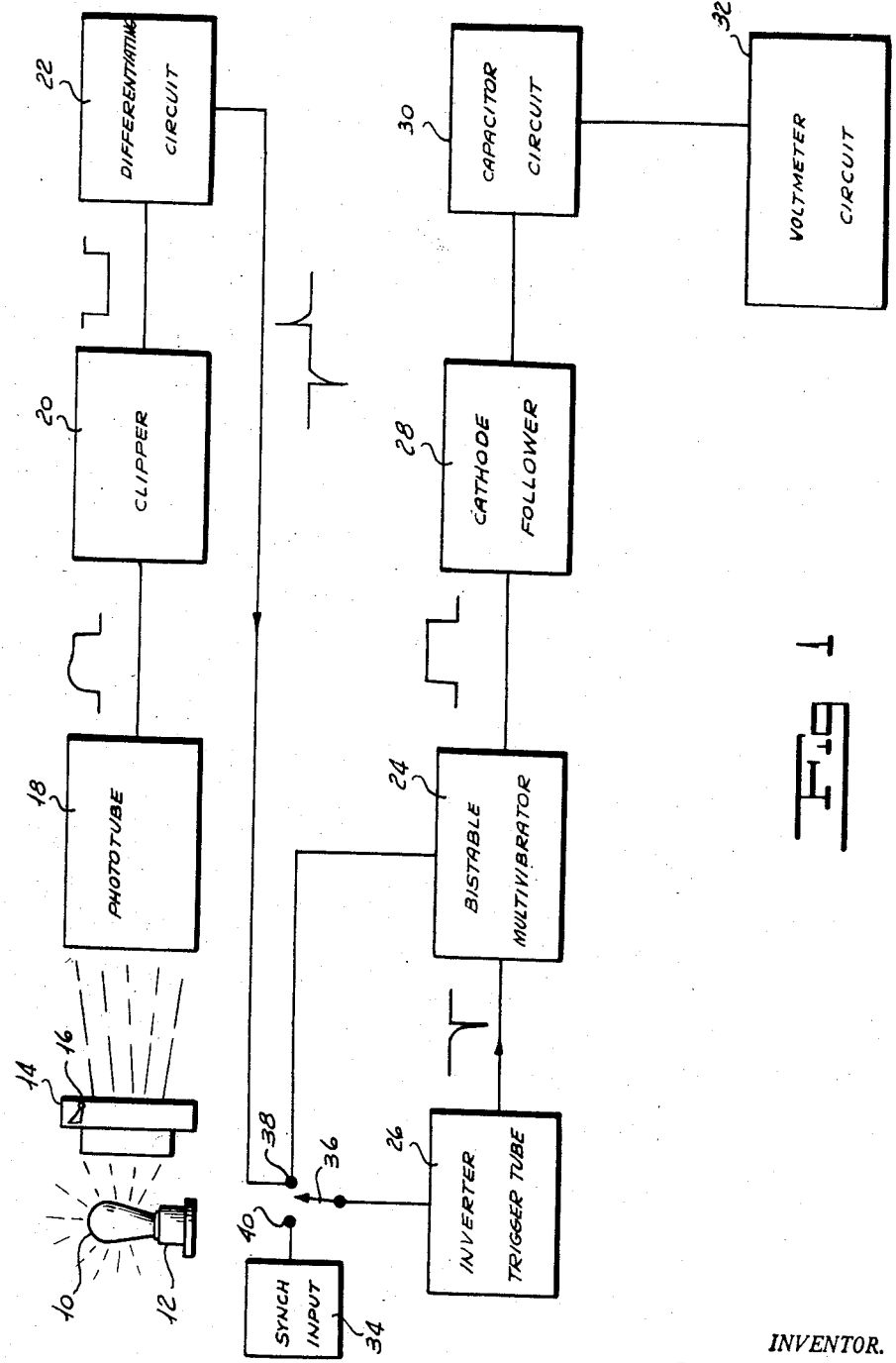

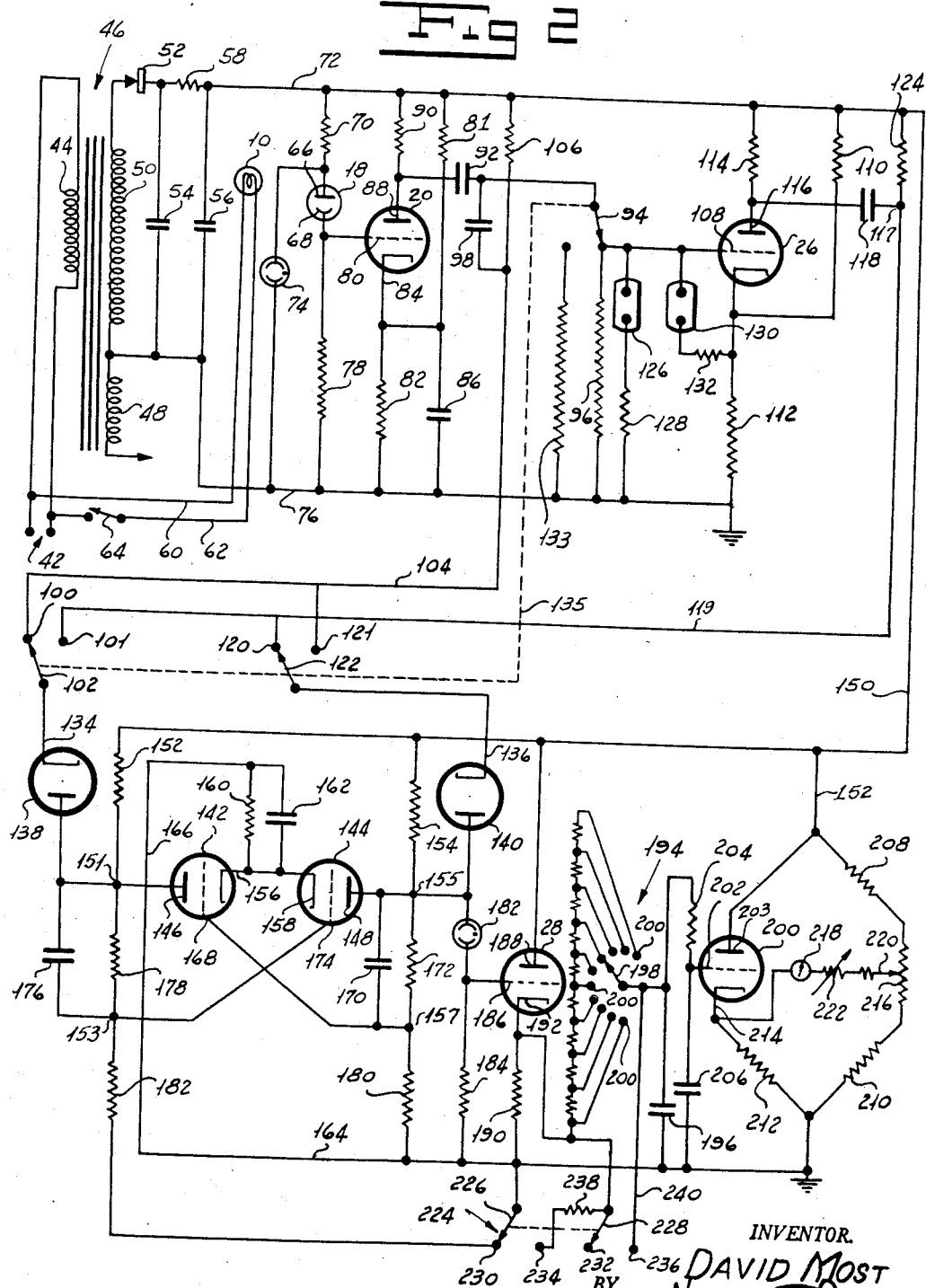

CAMERA SHUTTER AND SYNCHRONIZER TESTER

David Most, Brooklyn, N. Y., assignor to Rush Instrument Co., Inc., New York, N. Y., a corporation of New York Application June 12, 1953, Serial No. 361,243

12 Claims. (Cl. 324—68)

My invention relates to camera shutter and synchronizer testers and more particularly to an improved camera shutter and synchronizer tester which is capable of measuring shutter speeds and testing camera synchronizers with a high degree of accuracy.

In the field of photography and in the manufacture of photographic equipment it is often necessary to measure accurately very small intervals of time. For example, it is necessary to measure shutter speed, or the time interval between the instant the shutter is open to a predetermined extent and the instant when the shutter closes. It is also necessary to test shutter synchronizers. These synchronizers control the time interval between the time at which the synchronizing contacts of the shutter or flash gun contacts are closed and the time when the shutter is open to a predetermined degree. In order to test such synchronizers, some means must be provided for measuring this time. A third interval which must be measured is the time interval between the time when a shutter is open to a predetermined degree and the time when the synchronizing contacts are closed, that is, the so-called "X" delay.

Some time-measuring devices of the prior art employ resistance-capacitance timing circuits for measuring the time during which a phototube conducts as a result of a flash of light on its cathode. Such circuits are particularly adapted for use with photographic equipment. A light source is placed behind the shutter and the shutter actuated to cause a flash of light to strike the cathode of a phototube and the duration of the flash can be measured by means of an RC circuit connected to the phototube. In measuring circuits of the prior art, however, the charge acquired by the capacitor of the timing circuit may be affected by variable characteristics of the light source and the phototube. For example, the amount of emission from the phototube cathode during the time the light beam impinges on its surface may not be constant because of the nature of the cathode itself, or the light radiated from the light source during the period of time when the shutter is open may not be steady and may thereby vary the phototube output voltage. As a result of these variations, the capacitor will not charge at a uniform rate, and its final charge due to the flash of light will not be an accurate measure of the time of the flash. It will be affected by variations in the phototube output voltage during the interval because of irregular radiation from the light source or varying emission from the phototube cathode for any other reason.

I have invented an improved timing circuit adapted particularly for use with photographic equipment which measures only the interval of time between the instant when the shutter is open to a predetermined degree and the instant when it is closed to the same opening. My timing circuit is not affected by variations in source supplying the energy during the interval. Moreover, the magnitude of the source of energy emitting over the time interval has no effect on my device. While my improved timing circuit is particularly adapted for use with photographic equipment, it will be appreciated from the following description that my circuit is adapted to measure the duration of any short flash of energy.

One object of my invention is to provide an improved timing circuit which is adapted to measure extremely short time intervals with a high degree of accuracy.

Another object of my invention is to provide an improved timing circuit for measuring the shutter speed of a camera with a high degree of accuracy.

Still another object of my invention is to provide a timing circuit which is adapted to measure the time interval between the instant when a camera shutter is open to a predetermined degree and the instant when the shutter is closed to the same predetermined degree.

A further object of my invention is to provide a camera synchronizer tester which is adapted to test a shutter synchronizer with a high degree of accuracy.

A still further object of my invention is to provide a camera shutter and synchronizer tester which is capable of selectively measuring shutter speed or testing the shutter synchronizer with a high degree of accuracy.

Other and further objects of my invention will appear from the following description.

In general my invention contemplates the provision of a camera shutter and synchronizer tester including a source of radiant light energy disposed behind the shutter to be timed and a photoelectric device disposed in front of the shutter or vice versa. When the shutter is actuated, a flash of light from the light source impinges on the photoelectric device to produce an output voltage for an interval of time corresponding to the duration of the flash of light. A clipper circuit clips this output wave so that a substantially square wave is produced which is a measure of the interval of time between the instant when the shutter is open to a predetermined extent and the instant when the shutter is closed to the same extent. This square wave is differentiated by an appropriate circuit to produce two pulses, one negative corresponding to the time when the shutter opens and one positive corresponding to the time when the shutter closes. An inverter tube inverts the positive pulse so that two negative pulses result which are spaced along a time axis proportionally to the duration of the flash of light through the shutter. These negative pulses are applied to a bistable multivibrator through a pair of diode switches to produce an output pulse from the multivibrator which is a positive square wave of a width proportional to the duration of the flash of light. This positive pulse is applied to an RC timing circuit through a cathode follower and the charge accumulated by the capacitor is measured by a vacuum tube voltmeter. The charge on the capacitor will be proportional to the time interval between the time when the shutter was open to predetermined extent and the time when it was closed to a predetermined extent. Therefore, the vacuum tube voltmeter may be calibrated directly in the units of time so that the speed of the shutter may accurately be measured.

Further, I provide my apparatus with means for generating a pulse corresponding to the time when the shutter synchronizer contacts or flash gun contacts are closed. This pulse may be applied to the multivibrator in place of the inverted positive pulse marking the closing of the shutter so that the time interval between the time of closing of the synchronizer contacts and the time when the shutter is open to a predetermined degree may be measured. By this means the synchronizer can be tested. My apparatus is also capable of measuring "X" delay time in a similar manner.

In the accompanying drawings which form part of the instant specification and which are to be read in conjunction therewith and in which like reference numerals are used to indicate like parts in the various views:

Figure 1 is a block diagram of my improved camera shutter and synchronizer tester showing the arrangement of the elements making up the device and their relation to a shutter to be tested.

Figure 2 is a schematic view showing the electrical circuits employed in my improved camera shutter and synchronizer tester.

Referring now more particularly to the drawings, I arrange a light source, which may be an incandescent bulb 10, in a base 12. I may place this bulb behind the shutter 14 of the camera to be tested, or I may remove the shutter from the camera and dispose it in front of the light source. Shutter 14 has an actuating lever 16 by means of which it is operated. I arrange a phototube 18 in front of the shutter 14 so that when shutter 14 is operated by lever 16, light from source 10 will fall on the photosensitive cathode of the phototube 18 to produce an output voltage during the time the shutter is open. This output voltage is fed to a clipper circuit 20 which is biased well beyond cut off so that only the most positive part of the output of phototube 18 is amplified by the clipper. It is generally desirable to measure the time interval from the instant when the shutter is open to approximately 70 percent of the total opening and the time when it is closed to the same opening. The bias of clipper 20 is adjusted to accomplish this result, and the tube produces an output which is a negative, approximately square wave. A differentiating circuit 22 converts the negative square wave into a sharp negative pulse marking the instant when the shutter is open to the predetermined extent and a sharp positive pulse marking the time when the shutter is closed to a predetermined extent.

I provide a bistable multivibrator 24 which is adapted to be actuated by negative pulses to produce an output square wave of a width which is proportional to the separation of the actuating pulses along a time axis. Since bistable multivibrator 24 is actuated by negative pulses, the negative pulse from differentiating circuit 22 may be fed directly to the multivibrator, but the positive pulse must first be inverted. To invert this pulse, I feed it to an inverter and trigger tube 26 before it is fed to the multivibrator 24. That is, multivibrator 24 is first triggered to produce an output voltage by the pulse corresponding to the time when the shutter is open, and the negative pulse corresponding to the time when the shutter is closed to a predetermined extent cuts off this output voltage. The output wave from the multivibrator is therefore a positive square wave having a width corresponding to the time interval during which the shutter is open to the predetermined degree.

A cathode follower 28 applies the positive square wave to a capacitor charging circuit 30. The capacitor charging circuit 30 is a variable RC timing circuit, and the amount of charge acquired by the capacitor is measured by a vacuum tube voltmeter 32. Since this charge is proportional to the time during which the shutter is open, the meter scale can be calibrated directly in milliseconds or other appropriate units of time.

To provide a means by which the apparatus can be used to check shutter synchronizers, I provide a shutter synchronizer input circuit 34 which actuates the inverter and trigger tube circuit 26 to produce a pulse corresponding to the instant when the synchronizer contacts are closed. A switch selecting arm 36 is adapted to engage a contact 38 to couple the positive pulse from differentiating circuit 22 to inverter and trigger tube 26 or it may engage contact 40 to couple the synchronizer input circuit 34 to tube 26. Thus it will be seen that the negative pulse corresponding to the time the shutter opens to a predetermined extent is directly applied to multivibrator 24, while a switch 36 selectively couples either the positive pulse corresponding to the time when the shutter is closed or a pulse from the synchronizer input circuit 34 to the inverter tube 26 depending upon whether it is desired to measure the shutter speed or test the shutter synchronizer.

The circuits employed in my apparatus are illustrated in detail in Figure 2. A source of suitable alternating potential, indicated generally by reference character 42, feeds the primary winding 44 of a transformer, indicated generally by reference character 46. One secondary winding 48 of this transformer supplies energy to heat the cathodes of the tubes included in the circuits through appropriate connections (not shown). The other secondary winding 50 of transformer 46 feeds a rectifier 52 which may be a selenium oxide rectifier or the like. A filter including parallel capacitors 54 and 56 and a series resistor 58 smooths out the rectified voltage to provide a suitable source of direct current potential for the apparatus.

The light source 10 is connected across source 42 by leads 60 and 62 through a switch 64. The phototube 18 of my apparatus includes a plate 66 and a photosensitive cathode 68. Plate voltage is supplied to plate 66 through a resistor 70 connected to line 72 which is connected to the source of direct current potential supplied by rectifier 52 and its associated filter. A neon glow tube 74 between plate 66 and ground line 76 ensures a substantially constant potential at the plate 66. When light from source 10 is permitted to strike cathode 68, the phototube 18 will produce an output voltage. In order to ensure a high constant output voltage even if the light is somewhat dimmed, I arrange a large resistor 78 in the cathode circuit of phototube 18. The voltage across resistor 78 is applied to the grid 80 of clipper tube 20. A voltage divider including a resistor 81 and a resistor 82, connected between the cathode 84 of tube 20 and ground line 76, biases this clipper tube well beyond cutoff so that only the most positive part of the output of phototube 18 is amplified by tube 20. A by-pass condenser 86 across resistor 82 ensures that the bias voltage on resistor 82 will remain substantially constant. Plate potential is supplied to plate 88 of tube 20 from line 72 by a resistor 90.

The output wave form from clipper tube 20 will be, as explained hereinbefore, a negative, substantially square wave. We employ the differentiating circuit 22 to obtain a pair of sharp pulses, one negative and one positive, from this negative square wave, which pulses correspond, respectively, to the beginning and end of the wave. This differentiating or peaking circuit includes a capacitor 92 connected between plate 88 and either resistor 133 or 96 depending on the position of a switch contact arm 94. Switch contact arm 94 is adapted to connect capacitor 92 with the grid resistor 96 to couple the positive pulse to the grid 108 of inverter and trigger tube 26. A voltage divider including resistors 110 and 112 provides appropriate bias for the grid 108 of tube 26 to provide cutoff bias for the tube 26. Plate resistor 114 of tube 26 is connected between the plate 116 and line 72. A capacitor 118 couples the inverted positive pulse from tube 26 to a terminal 120 of a switch 122, which terminal is connected to line 72 by resistor 124. The differentiating circuit also includes a capacitor 98 which connects capacitor 92 to a terminal 100 of a switch 102 by a line 104 to apply the negative pulse directly to diode 138. Line 104 is connected to line 72 by a resistor 106. The parameters of peaking circuit 22 are chosen so that both trigger pulses are of substantially the same magnitude.

It will be noted that the grid 108 may be connected to ground through a plug 126 and a resistor 128 in series and a series circuit including a plug 130 and resistor 132 may connect grid 108 to the cathode of tube 26. These circuits are employed when it is desired to test the shutter synchronizer, as will be explained hereinafter. A resistor 133 is adapted to be engaged by switch arm 94 when a synchronizer is being tested to maintain the same time constant for differentiation of the leading edge of the pulse corresponding to the shutter opening time. Further, the trailing edge of the pulse corresponding to the closing of the shutter is dissipated to ground and will not affect the multivibrator.

It is also to be noted that switch arms 94, 102 and 122 are ganged by mechanical means, indicated by reference character 135, so that they will be operated simultaneously. A contact 101 is provided for engagement by arm 102 and a contact 121 for contact arm 122 when the switches are moved to a position where synchronizers are to be tested. Switches 102 and 122 are connected to the respective cathodes 134 and 136 of a pair of diodes 138 and 140. These diodes act as electronic switches to allow only negative triggering pulses to be passed to the multivibrator circuit. They also isolate the multivibrator from the rest of the circuitry of the tester to ensure stability of operation.

When the wave front from clipper tube 20 is impressed on the differentiating circuit, the sharp drop will create a peaked pulse which is in the negative direction. This negative pulse is passed by diode 138 to the multivibrator, since it is in a negative direction. When the wave from clipper 20 rises, however, the differentiator circuit will produce a positive pulse. This pulse cannot affect the multivibrator since the diode 138 will not pass positive pulses. To invert this positive pulse, I apply it to the grid 108 of tube 26 by means of resistor 96, which increases the plate current of tube 26. The plate potential will drop and the potential between point 117 and ground will drop correspondingly, producing a negative pulse. This negative pulse is applied to the cathode 136 of diode 140 through conductor 119. Since cathode 136 is connected to the source of positive potential 72 through either resistor 124 or resistor 106, the diode 140 will not normally conduct. However, when a negative pulse is applied to the cathode, it will be driven sufficiently negative so that diode 140 will conduct and pass the negative pulse. The action of diode 138 is similar so that it directly passes the negative pulse corresponding to the drop in potential of the negative square wave from clipper 20. It will be noted that the negative pulse produced by the differentiating circuit comprising capacitor 92 and resistor 96 will not be inverted since tube 26 is biased to cutoff.

The multivibrator circuit 24 includes, as can be seen in Figure 2, a pair of triodes 142 and 144, the respective plates 146 and 148 of which are supplied with positive potential from line 72 through line 150 and respective plate resistors 152 and 154. The cathodes 156 and 158 of the tubes are common and are connected to ground by conventional means including cathode resistor 160 and a by-pass condenser 162 tied to ground line 164 by a lead 166. Grid 168 of tube 142 is connected to the plate 148 of tube 144 by a parallel resistance-capacitance circuit including capacitor 170 and resistor 172. The grid 174 of tube 144 is connected to the plate 146 of tube 142 through a parallel RC circuit including capacitor 176 and resistor 178. Grids 168 and 174 are tied to ground by respective grid resistors 180 and 182.

The plate driven multivibrator circuit 24 is designed to be stable in either condition of operation, that is, with either tube conducting. One of the tubes is normally conducting, and in this case tube 144 has been selected as the normally conducting tube, since the circuit will not operate with tube 142 initially conducting. We ensure that tube 144 will be the initially conducting tube by means of a capacitor discharge switch to be described hereinafter. In the event that tube 142 is conducting when the operator attempts to make a measurement, the fact that it is conducting will immediately be evident, since the meter will remain in fully deflected position. In this event, the capacitor discharge switch must be pressed to reset the multivibrator.

It will be understood that series resistors 152, 178 and 182 form a voltage divider which normally provides a bias for grid 174 of tube 144 such that the tube conducts. The voltage divider formed by resistors 154, 172 and 180 functions in a similar manner, but since normally conducting tube 144 draws its plate current through resistor 154, the potential at point 155 and thereby at point 157 is such as will bias tube 142 beyond cutoff.

When the negative pulse corresponding to the instant when the shutter opens is applied to the cathode of diode 138, a circuit is completed through the diode, resistor 152, line 150 to line 72, through resistor 106 and contact arm 102 to cathode 134. When the diode thus conducts, increased current flows through resistor 152 and the potential of point 151 drops. This drop results in an equal drop in potential at point 153, which point is connected to the grid 174 of normally conducting tube 144. When grid 174 is thus driven more negative, tube 144 draws less plate current through resistor 154 so that the potential of points 155 and 157 will rise correspondingly. Since grid 168 is connected to point 157, its potential rises and the tube conducts to draw plate current through resistor 152. As plate curent is drawn through resistor 152, the potential of points 151 and 153 drops, driving grid 174 of tube 144 more negative. This cumulative action tending to cut tube 144 off and cause tube 142 to conduct, takes place very nearly instantaneously so that the effect of the application of a negative pulse to the cathode 134 of diode 138 is a switching of conduction from tube 144 to tube 142. Similarly, the application of the negative pulse to cathode 136 of diode 140 when the shutter closes cuts off tube 142 and causes tube 144 to conduct.

The result of this triggering and switching action is a positive square wave pulse in the output of tube 144 which corresponds to the time interval from the instant when the camera is open to a predetermined extent and the time when it is closed to a predetermined extent. The nature of multivibrators is such that once their action has been initiated, as by means of a trigger pulse, the magnitude of the output pulse is completely independent of the magnitude of the wave from which the triggering pulse was produced. That is, in our apparatus the magnitude of the output square wave from tube 144 is not affected by the magnitude or variations in the magnitude of the pulse from which the triggering pulses were produced in the interval between the triggering pulses.

A neon glow tube 182 couples the output voltage from tube 144 to the grid resistor 184 of the cathode follower tube 28. Tube 182 is employed to avoid distortion of the long voltage pulses. Grid resistor 184 is connected between the grid 186 of tube 28 and ground line 164. Plate 188 of tube 28 is connected to line 72 of the source of positive potential by line 150. The output of cathode follower 28 corresponding to the output pulse from the multivibrator appears across cathode resistor 190 connected between cathode 192 of tube 28 and ground line 164 and is applied to an adjustable time constant resistance-capacitance charging circuit including a stepped variable resistor, indicated generally by the reference character 194, and a capacitor 196 in series. Brush 198 of the variable resistor 194 is adapted to contact one of a number of terminals 200 of the resistor to vary the resistance in the charging circuit and thereby vary the scale factor of the meter. The charge on capacitor 196 is a measure of the time interval between the beginning and the end of the multivibrator pulse and is measured by the vacuum tube voltmeter 32.

Vacuum tube voltmeter 32 includes a triode 200, the grid circuit of the grid 202 of which includes a resistor 204 connected between grid 202 and brush 198 and a capacitor 206 between grid 202 and ground. This resistor and capacitor are employed to ensure a slow build-up of the voltage on grid 202 which protects the meter by ensuring a slow movement of the needle and preventing overshoot. As can be seen by reference to Figure 2, tube 200 forms one arm of a bridge including resistance arms 208, 210 and 212. Plate 203 of tube 200 is connected to one end of resistor 208, and the point of juncture is connected to line 72 by lead 152. Resistors 210 and 212 have a common terminal connected to the ground. The other end of resistor 212 is connected to the cathode 214 of tube 200. A resistor 216 connects resistors 208 and 210. The meter circuit including meter 218 is connected between cathode 214 and a brush 220 on resistor 216. The meter circuit also includes a variable resistor 222. Brush 220 may be moved along resistor 216 to adjust the zero point of meter 218 and resistor 222 may be varied to adjust the meter proportionality constant. It will be appreciated that depending upon how much resistance is placed in the charging circuit by variable resistor 194, the scale factor of the meter 218 will change.

I provide a double arm switch, indicated generally by reference character 224, to provide a means for rapidly discharging capacitor 196 to reset the multivibrator. In normal operation the respective arms 226 and 228 contact terminals 230 and 232. When it is desired to discharge condenser 196, arms 226 and 228 are moved to the respective terminals 234 and 236. In this position of the arms, condenser 196 will rapidly be discharged through a resistor 238 by a line 240 running from brush 198 to terminal 236. The remainder of the discharge circuit is through brush 228, through resistor 238 to terminal 234 and through brush 226 to ground line 164.

In use, when it is desired to employ my tester to measure shutter speeds, arms 94, 102 and 122 are moved to the positions indicated in Figure 2. Momentary contact switch 224 is pressed to ensure that condenser 196 is discharged and that the multivibrator is set so that tube 144 is conducting. The shutter 14 to be tested is disposed between light source 10 and phototube 18, and actuating lever 16 is pressed to operate the shutter. As soon as the shutter opens to permit light from source 10 to impinge on the cathode 68 of phototube 18, the phototube produces an output voltage. When the shutter closes, the phototube output voltage will be cut off. The resultant pulse appearing across resistor 78 is applied to clipper tube 20. Clipper tube 20 is biased to such an extent that only the most positive portion of the phototube output will be amplified by tube 20. That is, clipper 20 provides a means by which the time measurement is begun at the time when the shutter is open to a predetermined extent and the instant when it is closed to a corresponding degree which is controlled by bias of the grid of tube 20. Clipper tube 20 produces a negative square wave which is differentiated by the differentiating circuit 22. The differentiating circuit is arranged to produce a negative peaked pulse corresponding to the beginning of the time measurement and a positive peaked pulse corresponding to the end of the time measuring period. The negative peaked pulse is applied to the cathode 134 of diode 138 associated with the normally conducting multivibrator tube 144 through diode switch 138 to cut the tube off and initiate the multivibrator switching action. The positive peaked pulse, however, must first be inverted, since neither of the diodes 138 or 140 passes positive pulses. Inverter and trigger tube 26 provides a means by which this pulse is inverted. That is, as this pulse is impressed across the grid resistor 96 of tube 26, the current through plate resistor 114 of tube 26 increases to create a negative peaked voltage output at point 117. The conductor 119 feeds this pulse to diode 140 through brush 122. This pulse is applied to the cathode 136 of diode 140 associated with tube 142 to cut off the tube, which had been cut on by the multivibrator switching action when tube 144 was cut off. When tube 142 is thus cut off, tube 144 will again conduct so that its output will drop. The output from the multivibrator tube, therefore, is a positive square wave, the width of which is a measure of the time interval during which the shutter was open to a predetermined extent.

This positive square wave is applied by a cathode follower tube 28 to the RC timing circuit including variable resistor 194 and capacitor 196. The charge acquired by capacitor 196 for the period of the pulse is a measure of the time interval of the pulse. This charge is measured by the vacuum tube voltmeter circuit 32 which includes meter 218. It will be appreciated that after capacitor 196 has been charged by the positive pulse from the multivibrator, it will begin to discharge through variable resistor 194 and resistor 190 to ground. Cathode follower resistor 190 is selected to have a large value to ensure slow discharge of condenser 196 so that there is sufficient time to read meter 218. The time constant of the charging circuit is varied by moving the brush 198 of variable resistor 194 to change the scale factor of meter 218. Since the charge is a measure of time and the vacuum tube voltmeter measures the charge, meter 218 can be calibrated directly in time units. To discharge condenser 196 rapidly and reset the multivibrator for the next measuring operation, momentary contact switch 224 is depressed.

When it is desired to test a shutter synchronizer, the brushes 94, 102 and 122 are moved to contact resistor 133, contact 101 and contact 121, respectively. The conductor cable from the shutter is plugged into plug 130. Since it is desired in this case to measure the time between the instant when the synchronizer contacts are closed and when the shutter is open, the first pulse applied to the multivibrator circuit is the pulse generated in trigger tube 26 when the synchronizer contacts short the grid circuit to the cathode. It will be appreciated that the positive pulse from the RC differentiating circuit is grounded through brush 94 and resistor 133. The pulse from trigger tube 26 produced by the closing of the synchronizer contacts is fed to the diode 134 associated with the normally conducting multivibrator tube 144 by brush 102 connected to terminal 101. The negative pulse produced by the differentiating circuit 22 which corresponds to the time when the shutter is open to a predetermined degree is impressed on the cathode 136 of diode 140 associated with multivibrator tube 142 by brush 122 contacting terminal 121. The interval between these two triggering pulses is measured in the manner previously described. It is to be understood that brush 198 of resistor 194 is set to a position corresponding to the camera shutter setting.

When a shutter of the solenoid operated type is to be tested, the test is performed in the same manner, except that a cable from the tester unit is plugged into the flash lamp socket of the flash gun. This cable connects into the circuit across the terminals of plug 126.

When it is desired to measure "X" delay time or the time from the opening of the shutter until the time the flash contacts close, brushes 94, 102 and 122 are not moved but are left in the positions shown in Figure 2. The cable from the shutter, however, is plugged into plug 130. In this case, trigger tube 26 produces a negative pulse corresponding to the time when the flash contacts close. It will be appreciated that this pulse is prior in time to the pulse corresponding to the time when the shutter closes. The latter pulse will not affect the operation of the device.

Thus it will be seen that I have accomplished the objects of my invention. I have provided an improved timing circuit which is capable of measuring very short time intervals without being affected by variations in the source of energy from which the actuating energy is supplied. My timing circuit is particularly adapted for use in testing camera shutters and synchronizers. It provides means by which shutter speeds may be measured with a high degree of accuracy as well as means by which shutter synchronizers can be tested. It measures shutter speed without being affected by variations in the light source or in the emission properties of the phototube cathode. In addition, it may be employed to measure "X" delay time. Although the circuit has been described in connection with the testing of photographic equipment, it will be appreciated that it could be employed to measure any short time interval with a high degree of accuracy.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A camera shutter and synchronizer tester comprising in combination a source of radiant light energy disposed on one side of the camera shutter, a photoelectric device arranged on the other side of said shutter for producing an output voltage wave when said shutter is operated, means actuated by said output voltage wave for producing a first trigger pulse corresponding to the time when said shutter opens to a predetermined opening and a second trigger pulse corresponding to the time when said shutter closes to the predetermined opening, means connecting said means actuated by the output voltage wave to said photoelectric device, a bistable circuit actuated by said trigger pulses to produce a positive output pulse, means connecting said bistable circuit to the means actuated by the output voltage wave, means actuated by said output pulse for measuring the duration of the output pulse, and means connecting said measuring means to said bistable circuit.

2. A camera shutter and synchronizer tester as in claim 1 wherein said means actuated by the output voltage wave includes a clipper circuit for amplifying a predetermined portion of said wave to produce a clipped wave, means for differentiating said clipped wave to produce a negative trigger pulse and a positive trigger pulse, means connecting said differentiating means to said clipper circuit, means for inverting said positive pulse, and means connecting said inverting means to said differentiating means.

3. A camera shutter and synchronizer tester as in claim 1 wherein said measuring means includes a capacitor and a variable resistance.

4. A camera shutter and synchronizer tester comprising in combination a source of radiant light energy disposed on one side of the camera shutter, a photoelectric device arranged on the other side of said shutter for producing an output voltage wave when said shutter is operated, means for producing a first trigger pulse when the shutter synchronizing contacts are operated, means actuated by said output voltage wave for producing a second trigger pulse corresponding to the time when the shutter opens to a predetermined opening, means connecting the means for producing said second pulse to said photoelectric device, a bistable circuit actuated by said trigger pulses to produce a positive output pulse, means connecting said bistable circuit to the means for producing said first pulse and to the means for producing said second pulse, means actuated by said output pulse for measuring the duration of the output pulse, and means connecting said measuring means to said bistable circuit.

5. A timing circuit for measuring short intervals of time comprising in combination means for producing a negative substantially square voltage wave, a differentiating circuit for producing a first negative peaked pulse and a positive peaked pulse from said wave, means connecting said differentiating circuit to the means for producing the negative substantially square wave, an inverter for inverting said positive pulse to produce a second negative pulse, means connecting said inverter to said differentiating circuit, said first and second negative peaked pulses corresponding respectively to the beginning and the end of the interval to be measured, means actuated by said negative pulses to produce a pulse of constant magnitude the duration of which is a measure of said interval, means for coupling said negative pulses from said differentiating circuit and said inverter to the means actuated by the negative pulses, means for measuring the quantity of electricity contained in said pulse of constant magnitude to provide a measure of said interval, and means connecting said measuring means to said means actuated by said negative pulses.

6. A timing circuit for measuring short intervals of time comprising in combination means for producing a pair of peaked pulses of electrical energy corresponding respectively to the beginning and the end of the interval to be measured, means actuated by said pair of pulses to produce a pulse of constant magnitude the duration of which is a measure of said interval, means connecting said pulse-producing means to said means actuated by said pair of pulses, a resistance-capacitance timing circuit, means connecting said means actuated by the pair of pulses to said resistance-capacitance timing circuit, a meter for measuring the charge acquired by the capacitor of said timing circuit over the duration of said pulse of constant magnitude, and means for connecting said meter to said resistance-capacitance timing circuit.

7. Timing apparatus for measuring camera shutter speeds and testing shutter synchronizers comprising in combination means for producing a first trigger pulse corresponding to the time when said shutter opens and a second trigger pulse corresponding to the time when said shutter closes, means actuated by said trigger pulses to produce a pulse of constant magnitude the duration of which is a measure of the interval of time during which the camera shutter is open, means connecting the means actuated by said trigger pulses to said pulse-producing means, means including a resistor and capacitor connected in series for measuring the quantity of electricity in said pulse to provide an indication of said interval, means connecting said measuring means to the means actuated by said trigger pulses, means for measuring the charge acquired by said capacitor during the time when the means actuated by the trigger pulses operates, and means connecting said measuring means to said resistor and capacitor.

8. Timing apparatus for measuring camera shutter speeds and testing shutter synchronizers comprising in combination means for producing a negative pulse for the time when the shutter is open to a predetermined degree, a differentiating circuit for producing a first negative trigger pulse and a positive trigger pulse from said negative pulse, means connecting said differentiating circuit to said negative pulse-producing means, an inverter for inverting said positive trigger pulse to produce a second negative trigger pulse, means connecting said inverter to said differentiating circuit, said negative trigger pulses corresponding respectively to the time when said shutter opens and to the time when said shutter closes, means actuated by said negative trigger pulses to produce a pulse of constant magnitude the duration of which is a measure of the time interval during which the camera shutter is open, means connecting the means actuated by said negative trigger pulses to said differentiating circuit and to said inverter, means for measuring the quantity of electricity in said pulse of constant magnitude to provide an indication of said interval, and means connecting said measuring means to the means actuated by said trigger pulses.

9. A camera shutter and synchronizer tester including in combination a source of radiant light energy disposed on one side of a camera shutter to be tested, a photoelectric device disposed on the other side of the shutter to be tested, said photoelectric device receiving light energy from said source to produce an output voltage wave when said shutter operates, means responsive to said output voltage wave for producing a substantially square voltage pulse of substantially constant magnitude, said pulse having a leading edge corresponding to the time at which the shutter is open to a predetermined degree and a trailing edge corresponding to the time at which the shutter is closed to the same predetermined degree and means for measuring the quantity of electricity in said pulse to provide an indication of the duration of time between the opening and closing of said shutter to said predetermined degree.

10. A camera shutter and synchronizer tester as in claim 9 in which said means responsive to said output voltage wave includes a clipper.

11. A camera shutter and synchronizer tester including in combination a source of radiant light energy disposed on one side of the camera shutter, a photoelectric device disposed on the other side of the shutter to produce an output wave when said shutter is actuated, means responsive to said output wave for producing a pair of peaked pulses corresponding respectively to the time at which said shutter opens and to the time at which said shutter closes, means for producing a peaked pulse in response to operation of the camera synchronizer contacts, means actuated by a pair of peaked pulses for producing a substantially square output wave form having a substantially constant magnitude, means adapted to be operated alternatively to apply said pair of peaked pulses corresponding to the time at which the shutter opens and closes to said pulse-actuated means for testing a camera shutter and to apply the pulse corresponding to the time at which the shutter opens and the pulse corresponding to the closing of the synchronizer contacts to said pulse-actuated means when a camera synchronizer is to be tested, and means for measuring the quantity of electricity in said pulse of constant magnitude.

12. A tester as in claim 11 including means responsive to the operation of said alternatively actuated means for dissipating the peaked pulse corresponding to the time when the shutter closes when said alternatively actuated means is operated to apply the pulse corresponding to closing of the synchronizer contacts to said pulse-actuated means.

References Cited in the file of this patent

UNITED STATES PATENTS

| | | |
|---|---|---|
| 2,274,158 | Penther | Feb. 24, 1942 |
| 2,412,111 | Wilson | Dec. 3, 1946 |
| 2,644,133 | Soukaras | June 30, 1953 |

OTHER REFERENCES

Lawrence: Abstract Ser. No. 604,457, filed July 11, 1945, published June 13, 1950.